United States Patent
Gruhlke et al.

(10) Patent No.: US 6,906,853 B2
(45) Date of Patent: Jun. 14, 2005

(54) SYSTEMS AND METHODS FOR WAVELENGTH CONVERSION USING PHOTONIC BANDGAP SHIFTING

(75) Inventors: Russell Wayne Gruhlke, Fort Collins, CO (US); David Gines, Fort Collins, CO (US); Alfonso Benjamin Amparan, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 178 days.

(21) Appl. No.: 10/349,797

(22) Filed: Jan. 23, 2003

(65) Prior Publication Data

US 2004/0146243 A1 Jul. 29, 2004

(51) Int. Cl.⁷ .............................. G02F 1/365; G02B 6/34
(52) U.S. Cl. ........................ 359/332; 385/37; 385/122
(58) Field of Search .............................. 359/326–332; 385/37, 122

(56) References Cited

U.S. PATENT DOCUMENTS

| | | | | |
|---|---|---|---|---|
| 5,224,194 A | * | 6/1993 | Islam | 385/122 |
| 5,526,450 A | * | 6/1996 | Kester et al. | 385/16 |

* cited by examiner

Primary Examiner—John D. Lee

(57) ABSTRACT

Optical systems and methods for optical wavelength conversion are provided. One such exemplary optical system includes a waveguide located in a substrate at least partially of a non-linear optical material, the waveguide structured to receive a continuous-wave optical signal. Also included is a grating located at least partially in the non-linear optical material section of the waveguide. The grating has a period "d," and the waveguide produces a photonic bandgap when a forward propagating state of photonic energy of the continuous wave signal is separated from a backward propagating state of photonic energy of the continuous wave optical signal by a wavenumber ($k_z$) equal to ($2\pi/d$), at a first photonic energy level in the waveguide.

11 Claims, 6 Drawing Sheets

SYSTEMS AND METHODS FOR WAVELENGTH CONVERSION USING PHOTONIC BANDGAP SHIFTING

DESCRIPTION OF THE RELATED ART

Optical signal transmission systems typically encompass operations such as signal switching, signal multiplexing, and signal wavelength conversion. These operations may be implemented in an all-optical manner, or may be implemented using electro-optic techniques. Where signal processing speed is the primary criteria, the all-optical approach is favored over the electro-optic approach, because electro-optic techniques involve signal conversion between optical and electrical domains. This conversion leads to signal propagation delays, and can also introduce other deficiencies related to parameters such as device bandwidth limitations, signal-to-noise degradation, and powering requirements for electronic devices.

Signal wavelength conversion refers to a process in which an incoming optical signal of one wavelength is converted to an output optical signal of a different wavelength. The incoming optical signal is typically an optical carrier signal of a pre-determined wavelength that has been modulated by a base-band signal. It is desirable in certain applications that the wavelength of such an optical carrier signal be converted to a different wavelength. For example, the wavelength may be converted to one that is more suitable for processing by optical equipment. An exemplary system that is currently used for carrying out wavelength conversion incorporates one or more semiconductor lasers, and utilizes a laser-related optical phenomenon such as gain saturation, chirp-induced phase modulation, and four-wave mixing.

The disadvantage of using such an approach lies in the spontaneous emission inherent in the laser. This spontaneous emission generates detrimental optical noise which corrupts the output optical signal. The conversion process also requires a continuous-wave (CW) laser transmitter that can be tuned rapidly in relationship to the incoming signal. Rapidly-tunable CW lasers are expensive and often cumbersome to operate. In addition, they are restricted to operation over a narrow range of wavelengths, thereby restricting the signal conversion bandwidth available for use in an optical wavelength conversion system.

A second exemplary system that implements wavelength conversion uses a non-linear four-wave mixing technique. This technique requires the use of three input laser beams to generate a single output optical signal at the desired wavelength. The three laser devices that are required to generate the three input laser beams contribute significantly to the overall equipment cost and complexity, besides suffering from noise and bandwidth-related problems.

From the foregoing it can be appreciated that it would be desirable to have systems and methods for wavelength conversion and optical switching that overcome one or more of the drawbacks identified above.

SUMMARY OF THE INVENTION

The present invention involves a wavelength conversion system that includes a waveguide located at least partially in a substrate of non-linear optical material, the waveguide structured to receive a continuous-wave signal. The system also includes a grating located at least partially in the non-linear optical material section of the waveguide, the grating structured to receive an input optical signal. The system further includes an output port that is optically aligned to receive the continuous-wave optical signal propagated through the grating when the input optical signal is incident on the grating. The optical system incorporates a grating with a period "d," and the waveguide produces a photonic bandgap when a forward propagating state of photonic energy of the continuous wave signal is separated from a backward propagating state of photonic energy of the continuous wave optical signal by a wavenumber ($k_z$) equal to ($2\pi/d$), at a first photonic energy level in the waveguide. The optical system produces a shift in the photonic bandgap when a forward propagating state of photonic energy of the continuous wave signal together with the input optical input signal is separated from a backward propagating state of photonic energy of the continuous wave optical signal together with the input optical input signal by a wavenumber ($k_z$) equal to ($2\pi/d$).

A second embodiment of the invention provides a method for optical wavelength conversion. The method includes providing a grating located at least partially in non-linear optical material, illuminating the grating with a continuous-wave optical signal having an intensity, additionally illuminating the grating with an input optical signal having an intensity that, together with the intensity of the continuous-wave optical signal, produces a photonic bandgap that blocks onward propagation of the continuous-wave signal, modulating the intensity of the input optical signal to shift the photonic bandgap to allow onward propagation of the continuous-wave optical signal, and receiving the continuous wave optical signal modulated in accordance with the modulation of the input optical signal. The method further includes the step of illuminating the grating with only the continuous wave optical signal having an intensity to block the continuous wave optical signal from propagating through the grating.

Clearly, some embodiments of the invention may exhibit advantages in addition to, or in lieu of, those mentioned above. Additionally, other systems, methods, features and/or advantages of the present invention may become apparent to one with skill in the art upon examination of the following drawings and detailed description. It is intended that all such additional systems, methods, features and/or advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention involves the use of a waveguide formed at least partially of a non-linear optical material. The optical properties of non-linear materials are dependent on the intensity of light incident on the non-linear material. In particular, the refractive index of the non-linear optical material depends on the intensity of the incident light, where intensity is defined as optical energy per area. Optical energy per area may for example, be expressed in terms of watts/square millimeter. The properties of an optical waveguide containing non-linear material are dependent upon the intensity of light either incident the waveguide or propagating in the waveguide.

The portion of the waveguide located in the non-linear optical material incorporates a grating that creates a photonic bandgap at an energy level that depends on the intensity of light illuminating the grating. The grating may be implemented, for example, by forming corrugations in a surface of the waveguide. In an example, the grating is illuminated by a continuous wave (CW) optical signal propagating through the waveguide. The intensity of the CW optical signal sets the photonic bandgap to an energy level that prevents the CW optical signal from propagating out of the waveguide. An input optical signal additionally incident upon the waveguide increases the illumination intensity of the grating. The increased illumination intensity shifts the energy level of the photonic bandgap to one at which the CW optical signal is no longer blocked from propagating out of the waveguide. The shift in the energy level of the photonic bandgap may additionally prevent the input optical signal from propagating out of the waveguide. The illumination-dependent photonic bandgap shifting just described is used to carry out wavelength conversion upon the input optical signal.

Figure 1:
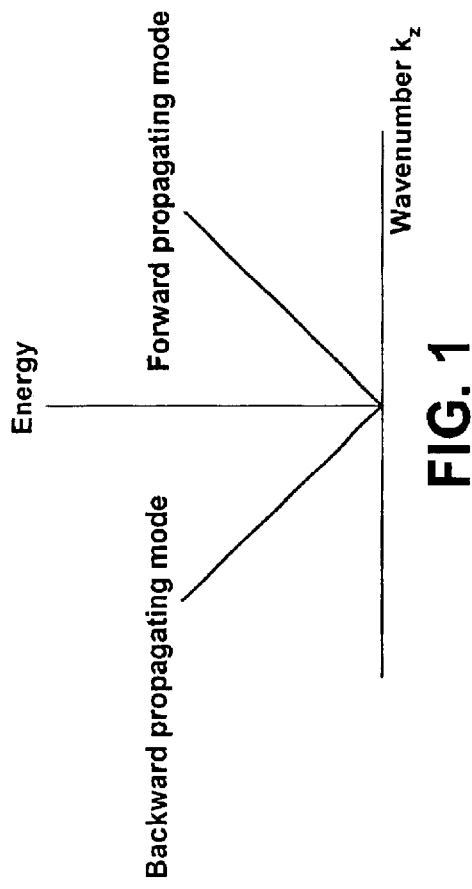
FIG. 1 illustrates a dispersion curve diagram that plots the possible photonic states for light propagating through an optical waveguide, plotted as energy levels versus wavenumber $k_z$.

FIG. 1 illustrates a dispersion curve diagram that plots the photonic states for light propagating through an optical waveguide, plotted as energy versus wavenumber $k_z$. The two modes of propagation shown are the forward and the backward propagation modes. A waveguide "mode" is used to describe the optical field pattern, or energy flow, created by an optical signal as it travels down an optical waveguide. The forward propagating mode refers to the pattern associated with that part of an optical signal traveling through the waveguide in one direction, while the backward propagating mode refers to the pattern associated with another part (possibly a reflected light signal) of the optical signal traveling through the waveguide in the opposite direction.

The slopes of the graphs related to these two modes are dependent upon the refractive index of the material in which the optical waveguide is fabricated, and the slopes may be modified by changing the refractive index. Certain types of non-linear optical material exhibit a refractive index that depends on the intensity of the light incident upon such material. A generalized equation for refractive index 'n' is $n=n_0+n_1 I+ \ldots$ (higher order terms). In this equation, the no term is dependent only upon the wavelength of the incident light. For example, when glass is described as having a refractive index of 1.5, the parameter implicit in this number is the wavelength at which the refractive index was measured, for example, 600 nm.

Defining the refractive index of non-linear optical material is more complicated because the refractive index is dependent not only on wavelength, but also on the intensity of the incident light. The $n_1 I$ term takes into account the dependence of 'n' on the intensity 1. Note that '$n_1$' can be a positive number or a negative number so that the refractive index can increase or decrease. Consequently, the refractive index of a non-linear optical material can be varied by changing the intensity of the incident light. This facilitates changing the propagating modes through the waveguide.

Figure 2:
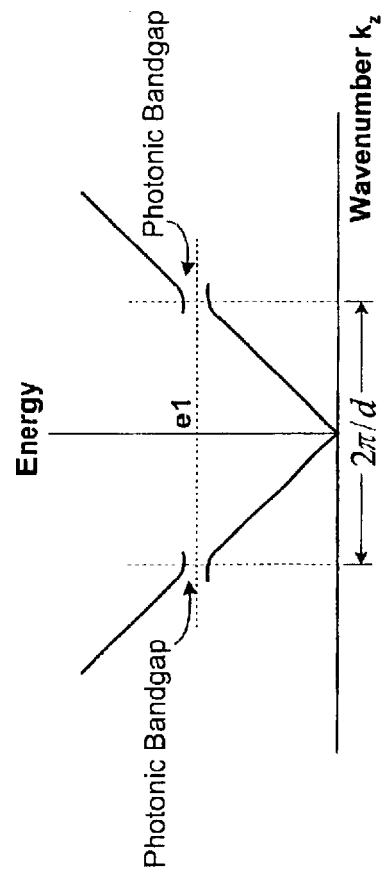
FIG. 2 illustrates the dispersion curve diagram of FIG. 1 together with a photonic bandgap when a conventional optical grating is present in a waveguide made of a linear material.

FIG. 2 illustrates the dispersion curve diagram of FIG. 1 together with a photonic bandgap that results from the presence of a conventional optical grating in a waveguide made of a linear material. The grating causes a light wave incident at a certain photon energy to couple into a photonic state that has a wavenumber equal to the original wavenumber $k_z$ plus or minus a multiple of $(2\pi/d)$, where "d" equals the grating period. At this new value of $k_z$, the forward propagating state and the backward propagating state are separated by exactly $(2\pi/d)$, and there is as much optical energy flowing through the waveguide in the forward direction as there is optical energy flowing through the waveguide in the backward direction. This condition leads to the presence of a standing wave. The standing wave indicates that there is no net energy flow in either direction, and this is shown in FIG. 2 as a photonic bandgap at an energy level e1. The grating can be incorporated into a waveguide by fabricating a corrugation with period equal to "d" in the waveguide or by doping the waveguide to form a periodic structure of regions of altered refractive index.

Figure 3:
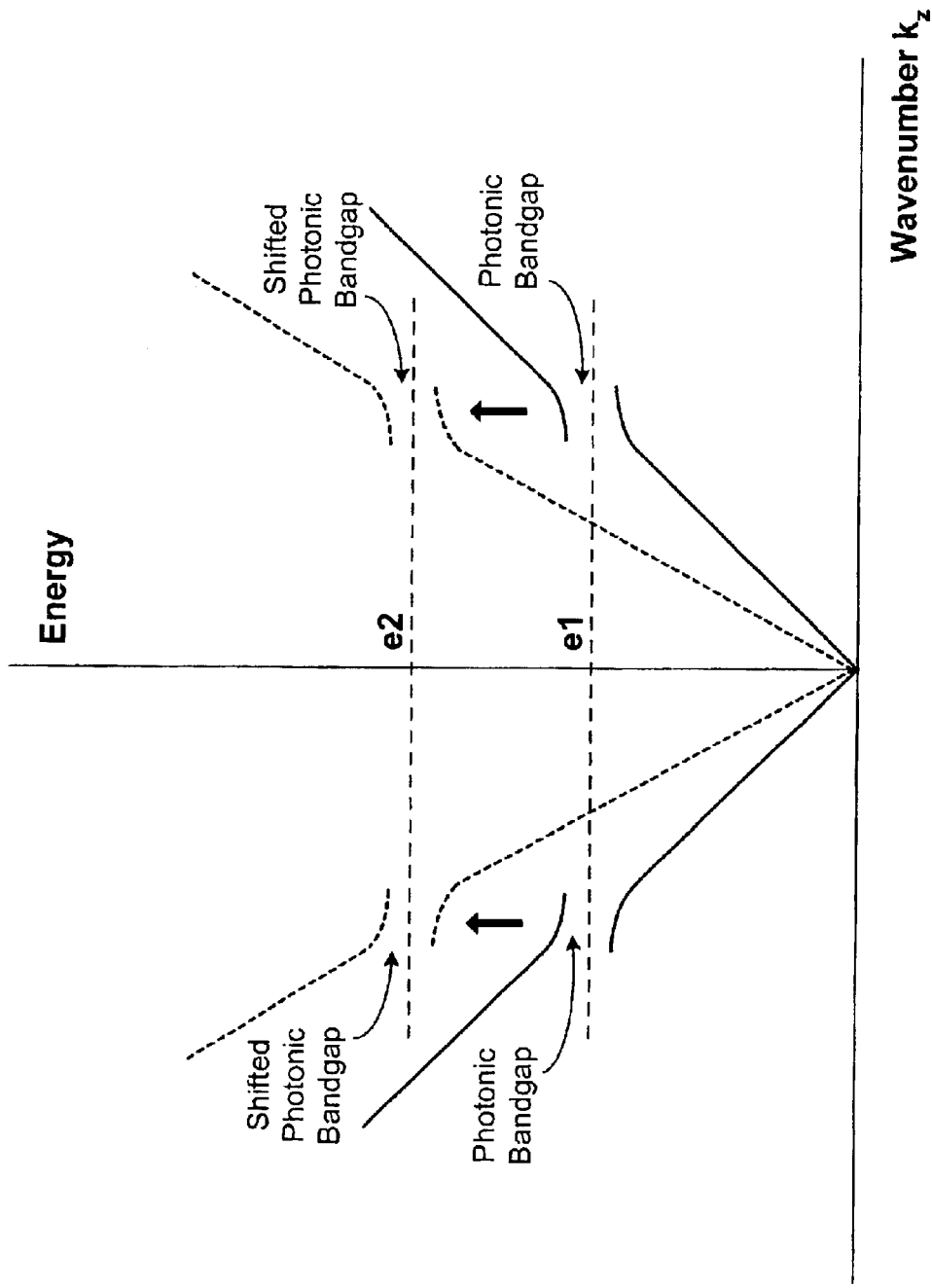
FIG. 3 illustrates photonic bandgap shifting in the dispersion curve diagram when an optical grating is fabricated in a corrugated substrate containing non-linear material.

FIG. 3 illustrates bandgap shifting in the dispersion curve diagram when an optical grating is fabricated in a substrate containing non-linear optical material. The waveguide is then fabricated to intersect the grating. Because the refractive index of the non-linear optical material can be controlled by adjusting the intensity of incident light, the slope of the forward propagating mode and the slope of the backward propagating mode can be changed. This change in slope causes the photonic bandgap to shift in energy. The shifted photonic bandgap is at a new energy level e2 that is different from the initial energy level e1. Energy level e2 is shown higher than energy level e1, but may alternatively be lower than e1. The solid lines indicate the dispersion curve of the incident light at an intensity I1, while the dotted lines indicate the dispersion curve at an intensity I2, where I2 is greater than I1 and the non-linear material has a positive change of refractive index with increasing intensity.

Figure 4:
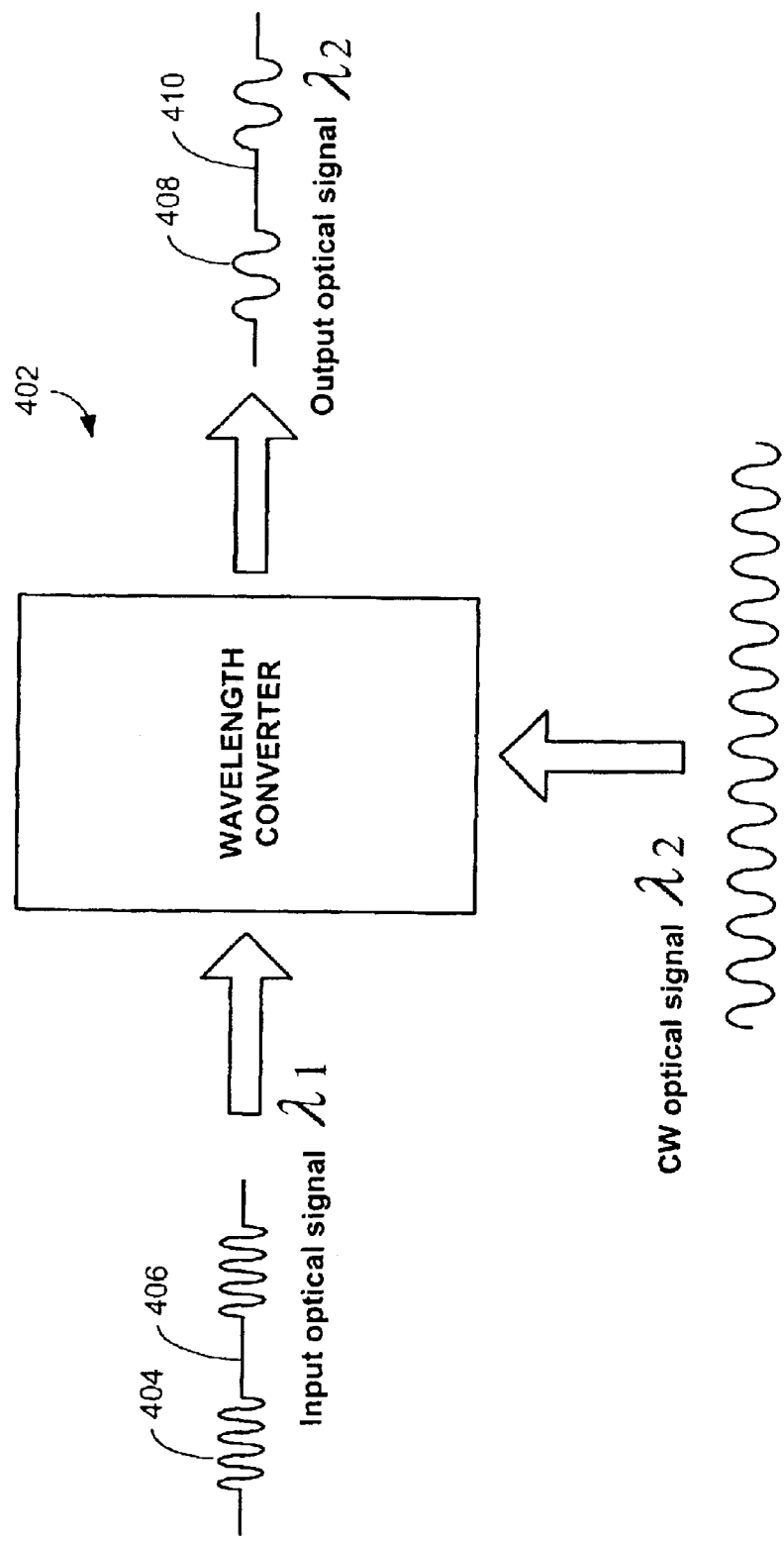
FIG. 4 is a block diagram illustrating the principle of operation of an exemplary wavelength converter using bandgap shifting.

FIG. 4 is a block diagram illustrating the operation of an exemplary wavelength converter 402. An input optical signal of wavelength λ1 is shown as a first input to the wavelength converter 402. A CW optical signal of wavelength λ2 is shown as a second input into wavelength converter 402. The intensity of the CW optical signal is lower than that of the input optical signal. The intensity variations of the input optical signal, used for example purposes, indicate the presence 404 of a signal of wavelength λ1 at certain instances of time, interspersed with instances in time when the signal is absent 406. The output optical signal reflects the intensity variations of the input optical signal—presence 404 of the input optical signal is associated with presence 408 of the output optical signal, while absence 406 of the input optical signal is associated with absence 410 of the output optical signal. The wavelength $\lambda 1$ of the input optical signal is converted to wavelength $\lambda 2$ in the output optical signal. Wavelength $\lambda 2$ is the wavelength of the CW optical signal.

Figure 5:
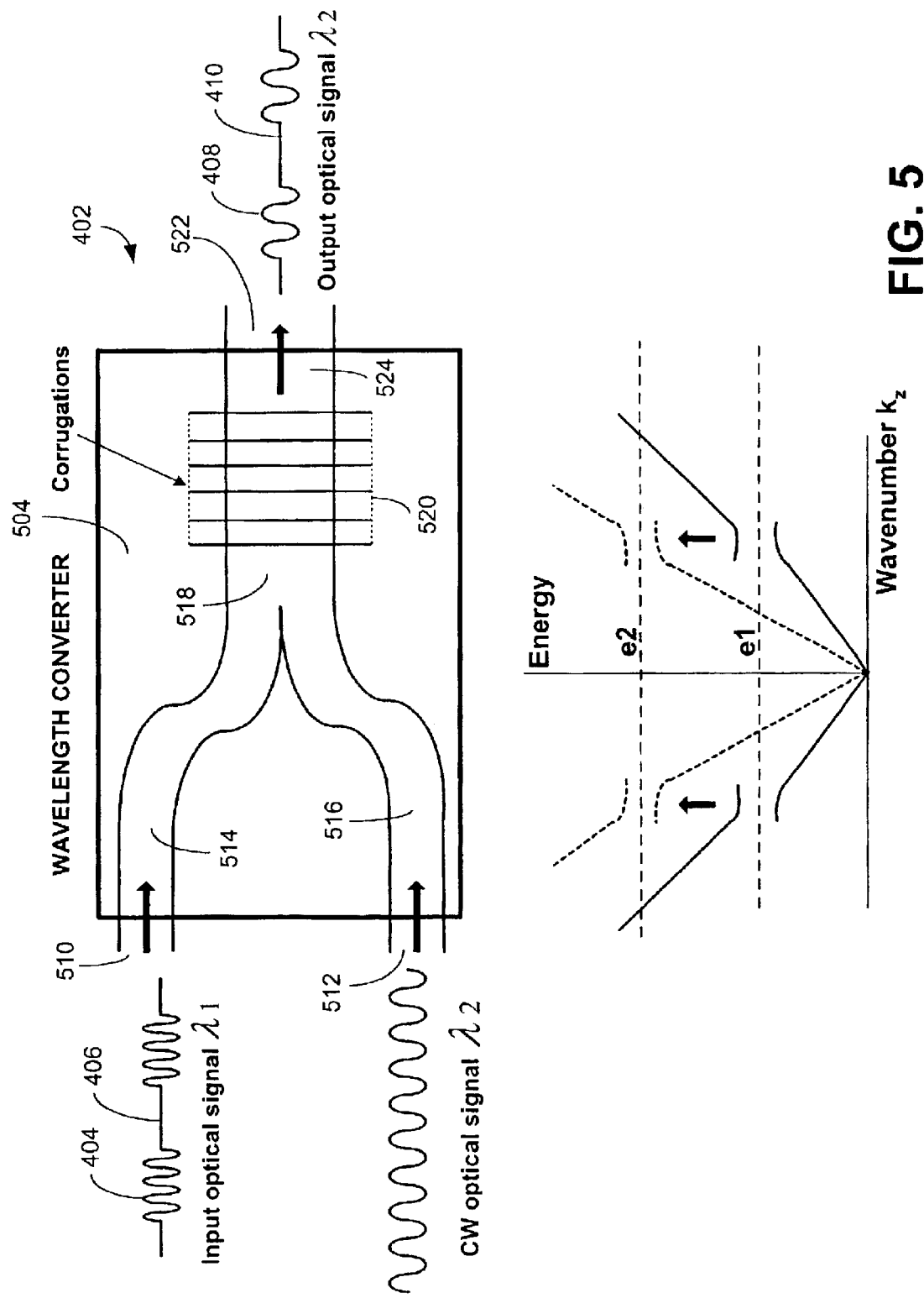
FIG. 5 is an illustration of the wavelength converter of FIG. 4 constructed in accordance with the present invention, when an input optical signal is provided to the grating via a waveguide.

FIG. 5 is an illustration of a first exemplary embodiment of a first wavelength converter 402 of FIG. 4 constructed in accordance with the present invention. The wavelength converter 402 is constructed in a planar lightwave circuit (PLC) that includes a planar waveguide (PWG) used to guide optical signals in a predetermined fashion. In one embodiment, a first input port 510 is optically coupled to a first input planar waveguide 514. The first input planar waveguide is fabricated in a PLC substrate 504 made of a non-linear optical material. The input port 510 may, for example, be implemented in the form of an optical coupling connector that is optically aligned to the waveguide 514. A second input port 512, which may also be implemented as an optical coupling connector, is optically coupled to a second input waveguide 516 formed in the same substrate 504. The two waveguides combine, typically in a y-formation, in the substrate to form a third waveguide 518 that passes through the grating 520 to an output waveguide 524. The grating takes the form of corrugations fabricated in the substrate 504 in this example. The output waveguide 524 leads to the output port 522. The output port 522 may be formed by a third optical coupling connector that is aligned to the output waveguide 524.

The input optical signal of wavelength $\lambda 1$ is fed into the first input port 510, while the CW optical signal of wavelength $\lambda 2$ is fed into the second input port 512 of wavelength converter 402. The two optical signals travel through the respective waveguides 514 and 516 and combine at the third waveguide 518 that feeds into the grating 520. In a first example of a wavelength converter system operation, when the input optical signal of wavelength $\lambda 1$ is absent, as illustrated by absence 406, the CW optical signal provides all the photonic energy present in the waveguide. This energy is represented by the value e1 in the dispersion curve diagram of FIG. 5. Under this condition the solid line indicates the displacement curve with the photonic bandgap located at e1. The presence of the photonic bandgap at e1 prevents the CW optical signal from propagating out of the output port 522 of wavelength converter 402. This condition corresponds to the absence 410 of the output optical signal.

When the input optical signal of wavelength $\lambda 1$ is present, as illustrated by presence 404, the input optical signal together with the CW optical signal provide the photonic energy present in the waveguide. This energy is represented by the value e2 in the dispersion curve diagram of FIG. 5. Under this condition the dashed line indicates the displacement curve with the photonic bandgap located at e2. The presence of the photonic bandgap at e2 prevents the input optical signal from propagating out of the wavelength converter 402, while allowing propagation of the CW optical signal out of the output port 522 of wavelength converter 402. This condition corresponds to the presence 408 of the output optical signal of wavelength $\lambda 2$.

Figure 6A:
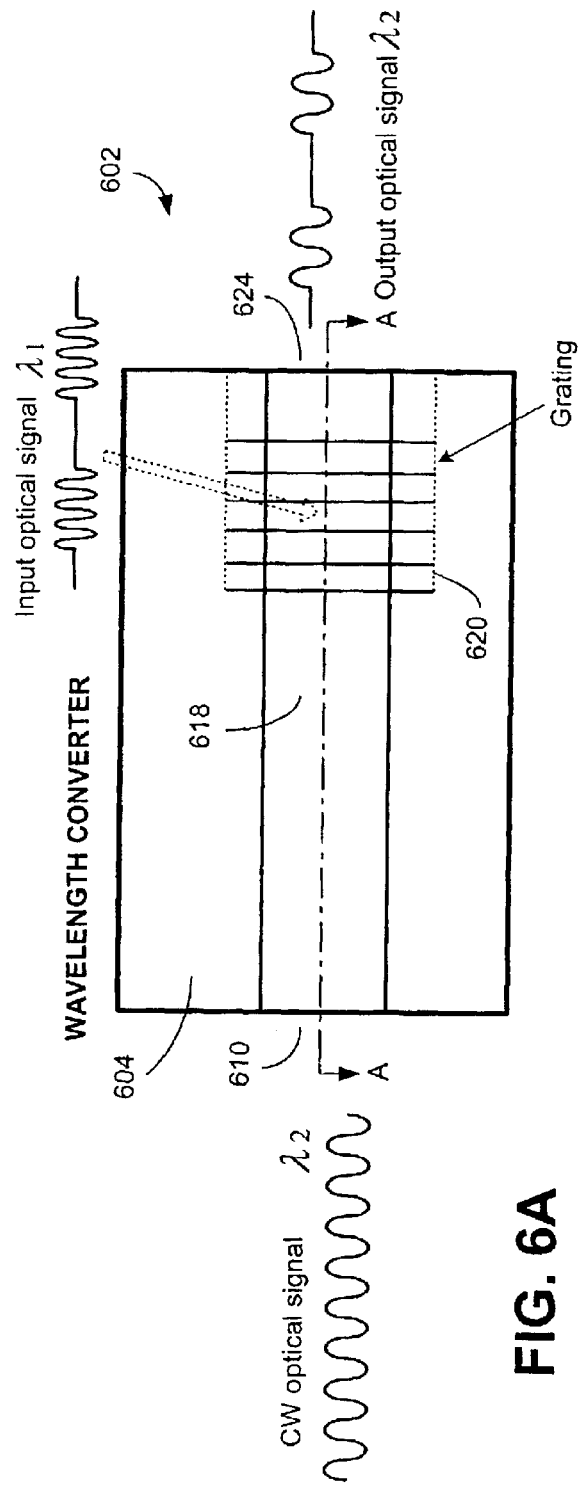
FIG. 6A is an illustration of the wavelength converter of FIG. 4, constructed in accordance with the present invention, when an input optical signal is provided to the grating via direct illumination.
Figure 6B:
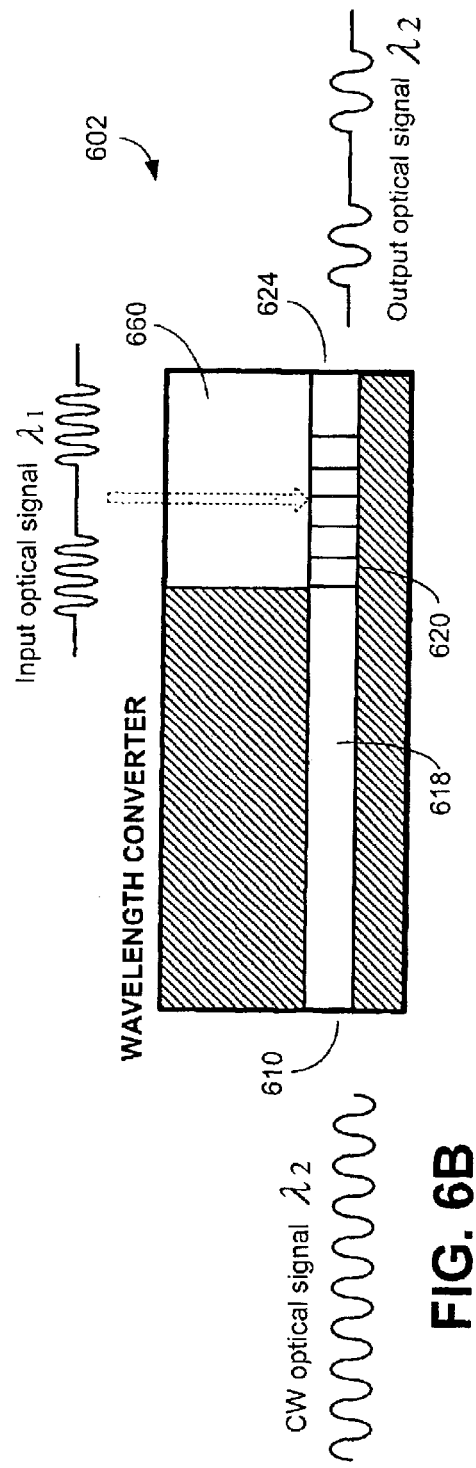
FIG. 6B is a cross-sectional view of the wavelength converter of FIG. 6A along the section line A—A.

FIG. 6A is an illustration of a second exemplary embodiment of the wavelength converter of FIG. 4, constructed in accordance with the present invention, in which the input optical signal is provided to the grating via direct illumination. FIG. 6B is a cross-sectional view of the wavelength converter of FIG. 6A along the section line A—A. The wavelength converter 602 is constructed in a planar lightwave circuit (PLC) that includes a planar waveguide (PWG) used to guide optical signals in a predetermined fashion. In one embodiment, an input port 610 is optically coupled into planar waveguide 618. Planar waveguide 618 is fabricated in a PLC substrate 604 made of a non-linear optical material. The input port 610 may, for example, be implemented in the form of an optical coupling connector that is optically aligned to the waveguide 618. Waveguide 618 passes through the grating 620, which takes the form of corrugations fabricated in the substrate 604 in this example. Output port 624 is optically coupled to the waveguide 618 and may be formed by a second optical coupling connector that is aligned to the waveguide 618.

The CW optical signal of wavelength $\lambda 2$ is fed into the input port 610, while an input optical signal directly illuminates the grating via the top surface region 660. Unlike the wavelength converter 402 of FIG. 5, wavelength converter 602 does not incorporate a waveguide to transport the input optical signal to the grating 620. Operation of wavelength converter 602 is similar to that of wavelength converter 402 in terms of wavelength conversion of the input optical signal with wavelength $\lambda 1$ to output optical signal with wavelength $\lambda 2$.

Figure 7:
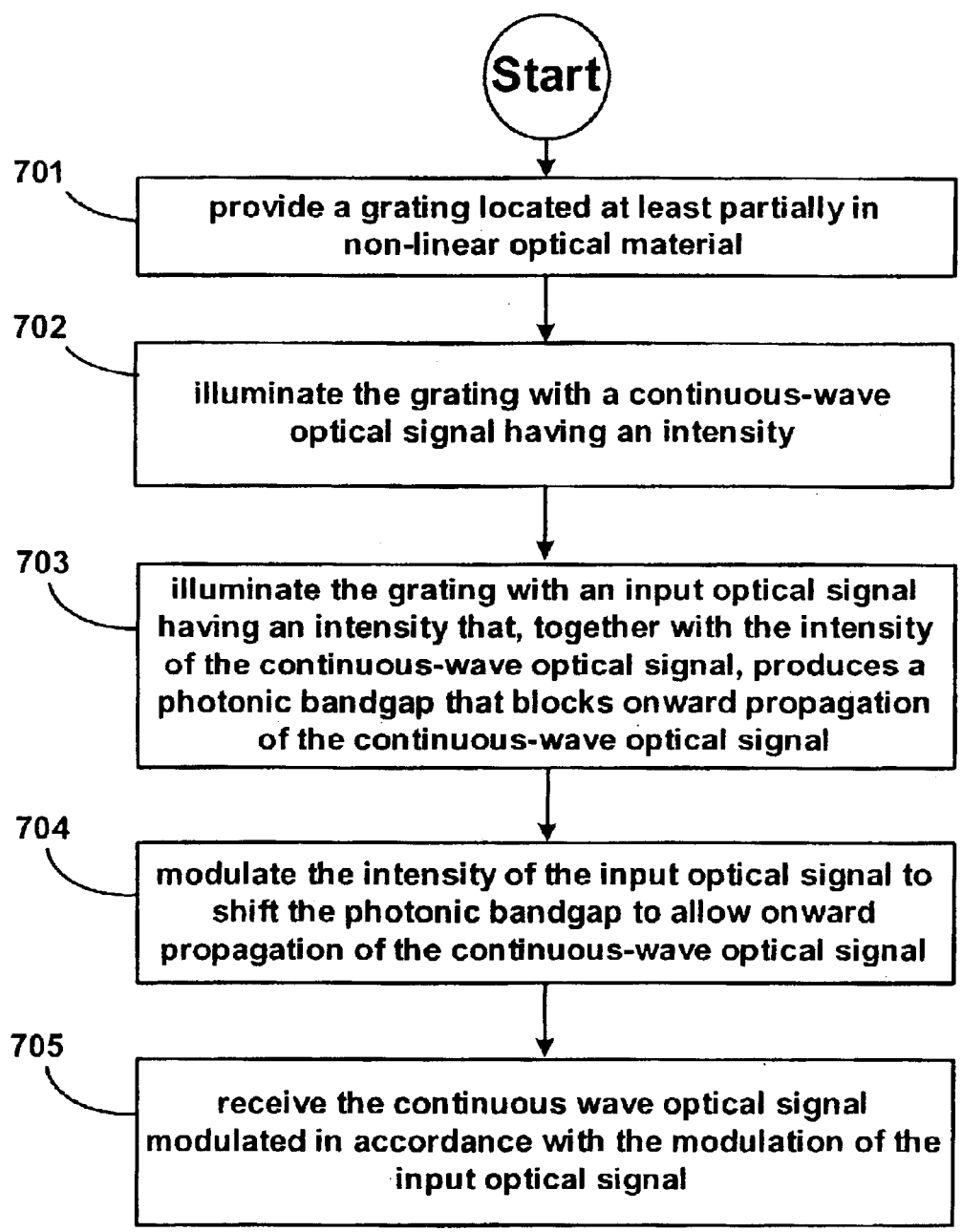
FIG. 7 is a flow chart that shows a method for wavelength conversion of an input optical signal.

FIG. 7 is a flow chart that shows a method in accordance with the invention for converting the wavelength of an input optical signal. It will be understood that the various blocks of the flow-chart are shown in one specific sequence merely as an example, and the order of implementation of these blocks maybe modified in other applications. In block 701 a grating that is located at least partially in non-linear material is provided, and in block 702, the grating is illuminated with a continuous-wave (CW) optical signal having an intensity. In block 703, the grating is illuminated by an input optical signal having an intensity that, together with the intensity of the CW optical signal, produces a photonic bandgap that blocks onward propagation of the CW optical signal. In block 704, the intensity of the input optical signal is modulated to shift the photonic bandgap to allow onward propagation of the CW optical signal. The CW optical signal modulated in accordance with the modulation of the input optical signal is received, in block 705. This action, as described earlier, constitutes a wavelength conversion process, and such a system performs as a wavelength converter.

It must be emphasized that the above-described embodiments of the present invention are merely possible examples of implementations, and are merely set forth for a clear understanding of the principles of the invention. Many variations and modifications may be made to the above-described embodiments of the invention without departing substantially from the spirit and principles of the invention. For example, while in FIGS. 6A and 6B the CW optical signal is directed into waveguide 618 and the input optical signal is directed directly upon grating 620, it will be understood that in an alternative embodiment, the input optical signal may be directed to the grating via waveguide 618 while the CW optical signal is directed directly upon grating 620. All such modifications and variations are included herein within the scope of this disclosure and the present invention and protected by the following claims.

What is claimed is:

1. An optical wavelength conversion system, comprising:
   a waveguide located in a substrate at least partially of a non-linear optical material, the waveguide structured to receive a continuous-wave optical signal; and
   a grating located at least partially in the non-linear optical material section of the waveguide, wherein the grating has a period "d," and the waveguide produces a photonic bandgap when a forward propagating state of photonic energy of the continuous wave signal is separated from a backward propagating state of photonic energy of the continuous wave optical signal by a wavenumber ($k_z$) equal to ($2\pi/d$), at a first photonic energy level in the waveguide.

2. The optical system of claim 1, wherein the waveguide shifts the photonic bandgap when a forward propagating state of photonic energy of the continuous wave signal together with the input optical input signal is separated from a backward propagating state of photonic energy of the continuous wave optical signal together with the input optical input signal by a wavenumber ($k_z$) equal to ($2\pi/d$), to a second photonic energy level in the waveguide.

3. The optical system of claim 2, wherein the waveguide is structured additionally to receive the input optical signal and to guide the input optical signal to illuminate the grating.

4. The optical system of claim 2, wherein the input optical signal illuminates the grating via an optical path external to the waveguide.

5. A wavelength conversion method, comprising:

providing a grating located at least partially in non-linear optical material;

illuminating the grating with a continuous-wave optical signal having an intensity;

additionally illuminating the grating with an input optical signal having an intensity that, together with the intensity of the continuous-wave optical signal, produces a photonic bandgap that blocks onward propagation of the continuous-wave signal; and modulating the intensity of the input optical signal to shift the photonic bandgap to allow onward propagation of the continuous-wave optical signal.

6. The method of claim 5, wherein additionally illuminating the grating with an input optical signal comprises setting the intensity of the input optical signal to substantially zero; and wherein modulating the intensity of the input optical signal comprises increasing the intensity of the input optical signal.

7. The method of claim 5 further comprising illuminating the grating with the continuous wave optical signal by directing the continuous-wave optical signal towards the grating via a waveguide, and illuminating the grating with the input optical signal by directing the input optical signal towards the grating via the waveguide.

8. The method of claim 5 further comprising directing the continuous wave optical signal towards the grating via a waveguide, and directing the input optical signal towards the grating via an optical path external to the waveguide.

9. The method of claim 5 further comprising directing the input optical signal towards the grating via a waveguide, and directing the continuous wave optical signal towards the grating via an optical path external to the waveguide.

10. The method of claim 5, wherein additionally illuminating the grating with an input optical signal comprises setting the intensity of the input optical signal to a first intensity; and wherein modulating the intensity of the input optical signal comprises increasing the first intensity of the input optical signal.

11. The method of claim 5, wherein additionally illuminating the grating with an input optical signal comprises setting the intensity of the input optical signal to a first intensity; and wherein modulating the intensity of the input optical signal comprises decreasing the first intensity of the input optical signal.

* * * * *